Dec. 29, 1925.
O. J. ALLISON
1,567,025
AUTOMOBILE TIRE TOOL
Filed April 20, 1925
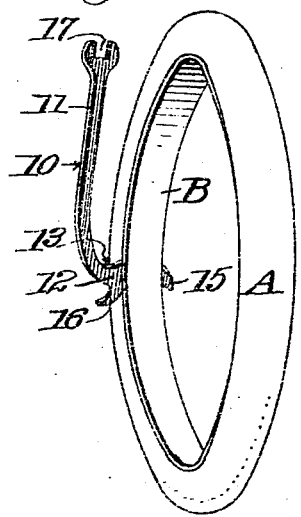
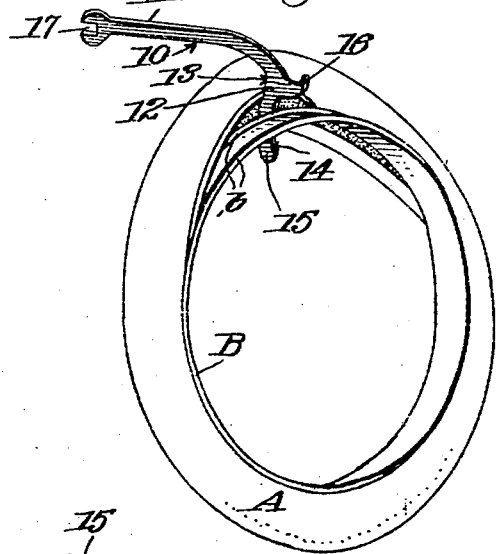
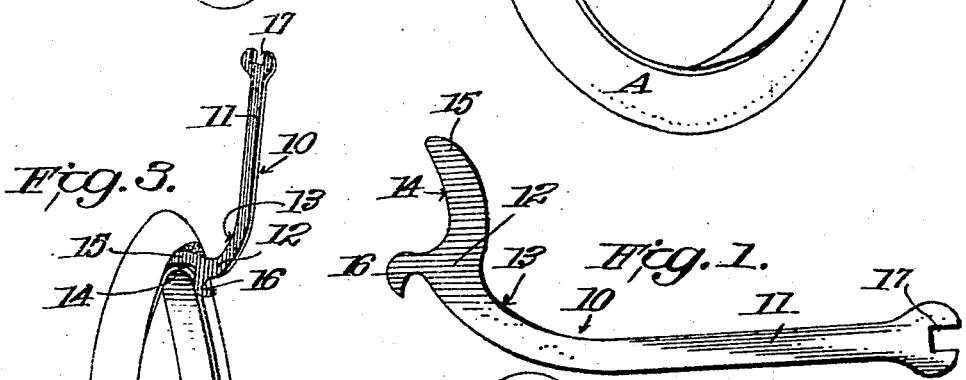
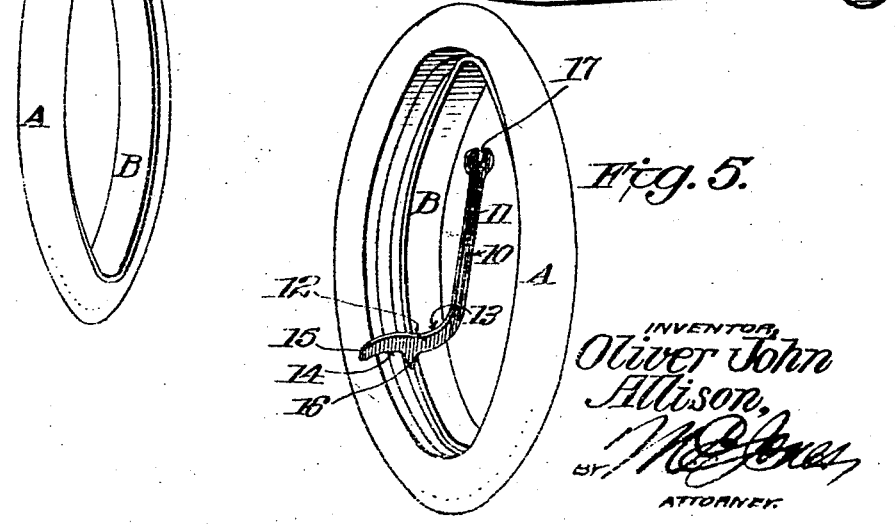
INVENTOR,
Oliver John Allison,
ATTORNEY.

Patented Dec. 29, 1925.

1,567,025

UNITED STATES PATENT OFFICE.

OLIVER JOHN ALLISON, OF NEW ORLEANS, LOUISIANA.

AUTOMOBILE TIRE TOOL.

Application filed April 20, 1925. Serial No. 24,702.

*To all whom it may concern:*

Be it known that I, OLIVER JOHN ALLISON, a citizen of the United States, residing at New Orleans, in the parish of Orleans and the State of Louisiana, have invented a new and useful Automobile Tire Tool; and that I claim it as new and not to have been in use before I made application for Letters Patent on same.

My invention relates to a tool or wrench adapted for use in the removal and replacement of tires on automobile or other wheels.

It is particularly aimed to provide an article of this character wherein the operations may be expeditiously performed and to produce such a device as is exceedingly simple in construction and may even be made in a single piece.

The more specific objects and advantages will become apparent from a consideration of the description following taken in connection with the accompanying drawings illustrating an operative embodiment.

In said drawings:—

Figure 1 is a plan or elevation of the improved tool;

Figure 2 is a perspective view showing the tool in initial position as applied between a rim and tire in the removal of the latter.

Figure 3 is a perspective view of the same parts as Figure 2 showing the tool in its second position for the removal of a tire;

Figure 4 is a view of the same parts as Figures 2 and 3 showing the tool in its third position for the removal of a tire and Figure 5 is a perspective view showing the tool positioned in connection with and for the replacement of a tire onto a rim.

Referring specifically to the drawing wherein like reference characters designate like or similar parts, the tool forming the subject-matter of the present invention, is generally designated 10 and best shown in Figure 1. Said tool may have a handle or shank 11, one end portion of which, substantially to the extent of one fourth of a circle, is formed into a compound curve or the equivalent as at 12, producing a concave edge at 13 and a concave edge at 14 on opposite sides of said portion 12. The terminal portion having the curve 14 is, in effect, a hook 15, which is of a length sufficient to enable it to be interposed between a tire A and a rim B, as best shown in Figure 2. At the junction of the curved portions having the edges 13 and 14, a hook 16 is provided whose bill extends in the direction away from the hook 15 so as to be sharply backturned.

The gripping end of handle or shank 11 is formed into a wrench, since it has an opening or socket 17 adapted to engage nuts and usually the nuts which may secure the rim B to a wheel.

The tool is preferably made in a single metallic casting and is bar-like, that is of slight thickness, especially to enable its insertion between a rim and tire.

It is to be understood, of course, that the showing of the tire and rim A and B, respectively, is to be taken as conventional. The rim specifically is of the type made in one piece and having an outwardly extending circumferential bead $b$ at each edge.

In using the tool, it is held by the hand at the shank 11 and inserted flatwise between a tire A and rim B, at the hook 15, as shown in Figure 2. A screw-driver or similar instrument, if desired, may be used to facilitate the insertion of the hook 15 into the position mentioned. From the position of Figure 2, the tool is turned at a right angle to its position of Figure 3, where it is substantially radially of the tire and rim with the handle 11 extending outwardly. In this position, the hook 16 initially engages the adjacent edge of the rim B. From the position of Figure 3, the tool is pulled laterally as shown in Figure 4, with the edge 13 engaging the tire and edge 14 fulcruming on one side of the rim, and thus removing or displacing the tire.

To replace the tire, the same is first applied to the rim as far as practical and usual after which the tool is arranged as shown in Figure 5, being disposed substantially radially of the tire and rim with edge 14 engaging the bead edges of the tire and the hook 16 at its notch engaging the adjacent edge of the rim. Thus, when the handle 11 is pulled outwardly, the tool engages the height of the tire and fulcrums at the hook 16 on the rim, accordingly moving the hook 15 inwardly and forcing the tire onto the rim, with the hook 16 finally automatically disengaging the rim, or being capable of ready manual disengagement therewith.

Various changes may be resorted to within the spirit and scope of the invention.

I claim:—

A tire tool having a substantially straight shank, said shank at one end being provided with an extension which as a whole describes a curve of about one-fourth of a circle, said extension on the outside of the curve at about the middle thereof having a sharply backturned hook adapted to engage a tire-retaining flange of a rim and suspend the shank radially of the rim, the further extension of said curve beyond said hook being slightly recurved in the opposite direction and being sufficient in extent to span the inside width of a complete tire so as to engage under both flanges of the tire and lift the same onto a rim and then engage substantially the height of the tire and push the same bodily laterally of the rim.

OLIVER JOHN ALLISON.